(12) United States Patent
Tarchala

(10) Patent No.: US 11,842,409 B2
(45) Date of Patent: Dec. 12, 2023

(54) GUIDING VEHICLE USERS TO BUILD VALUE WITH VEHICLE USE

(71) Applicant: Honda Motor Co., Ltd., Tokyo (JP)

(72) Inventor: Christopher John Tarchala, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 17/691,446

(22) Filed: Mar. 10, 2022

(65) Prior Publication Data

US 2023/0289894 A1    Sep. 14, 2023

(51) Int. Cl.
G06Q 40/00    (2023.01)
G06Q 40/12    (2023.01)

(52) U.S. Cl.
CPC ................... G06Q 40/12 (2013.12)

(58) Field of Classification Search
CPC .................................... G06Q 40/12
See application file for complete search history.

(56) References Cited

U.S. PATENT DOCUMENTS

| | | |
|---|---|---|
| 8,688,504 B2 | 4/2014 | Reisman |
| 9,773,251 B2 | 9/2017 | Liu et al. |
| 9,900,747 B1 | 2/2018 | Park |
| 10,121,162 B2 | 11/2018 | Fletcher et al. |
| 10,818,108 B2 | 10/2020 | Wang et al. |
| 10,928,209 B2 | 2/2021 | Scofield et al. |
| 11,346,672 B2 * | 5/2022 | Kline ............ G01C 21/365 |
| 2017/0337573 A1 | 11/2017 | Toprak et al. |
| 2018/0114192 A1 | 4/2018 | Bryant |
| 2020/0311782 A1 | 10/2020 | Hoover et al. |

FOREIGN PATENT DOCUMENTS

JP    2005108055 A    4/2005

* cited by examiner

*Primary Examiner* — Paul Danneman
(74) *Attorney, Agent, or Firm* — Aaron Fong; American Honda Motor Co., Inc.

(57) ABSTRACT

An electronic device and method for guiding vehicle users to build a value with vehicle use is provided. The electronic device collects usage data associated with a vehicle and competition information associated with one or more transport options that are different from the vehicle. The electronic device determines saving information associated with a use of the vehicle over a period, based on the usage data and the competition information. The electronic device further determines one or more milestones that are achieved over the period or are yet to be achieved to accumulate a net value which exceeds expenses associated with the vehicle. Such milestones are associated with the use of the vehicle and are determined based on the saving information and the usage data. The electronic device controls a display to render guidance information that includes the net value and information about such milestones.

20 Claims, 4 Drawing Sheets

GUIDING VEHICLE USERS TO BUILD VALUE WITH VEHICLE USE

BACKGROUND

Advancements in technology, especially in micro-mobility solutions have led to a rise in various travel options, such as ride sharing services, last mile services, pay-as-you-go rides, and car rental services which allow a user to travel to locations of his/her choice. Often, users may not be aware if they are able to cover up and get value out of their personal vehicle after spending a considerable amount on expenses on rent, purchase, taxes, maintenance, and the like. Without any guidance or support, many users often end up using other travel options which may often cost more than the expenses incurred on their personal vehicle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an electronic device. The electronic device may include a display and circuitry. The circuitry may collect usage data associated with a vehicle and competition information associated with one or more transport options that may be different from the vehicle. The circuitry may determine saving information associated with a use of the vehicle over a period, based on the usage data and the competition information. The circuitry may further determine one or more milestones that may have been achieved over the period or may have to be achieved to accumulate a net value which exceeds expenses associated with the vehicle. Such milestones may be associated with the use of the vehicle and may be determined based on the saving information and the usage data. The circuitry may control the display to render guidance information that includes the net value and information about the one or more milestones.

Another exemplary aspect of the disclosure provides a method. The method may include collecting usage data associated with a vehicle and competition information associated with one or more transport option that may be different from the vehicle. The method may include determining saving information associated with a use of the vehicle over a period, based on the usage data and the competition information. The method may further include determining one or more milestones that may have been achieved over the period or may have to be achieved to accumulate a net value which exceeds expenses associated with the vehicle. Such milestones may be associated with the use of the vehicle and may be determined based on the saving information and the usage data. The method may further include controlling a display to render guidance information that includes the net value and information about the one or more milestones.

Another exemplary aspect of the disclosure provides a non-transitory computer-readable medium having stored thereon, computer-executable instructions. The computer-executable instructions that when executed by an electronic device may cause the electronic device to execute operations. The operation may include collecting usage data associated with a vehicle and competition information associated with one or more transport option that may be different from the vehicle. The operation may further include determining saving information associated with a use of the vehicle over a period, based on the usage data and the competition information. The operation may further include determining one or more milestones that may have been achieved over the period or may have to be achieved to accumulate a net value which exceeds expenses associated with the vehicle. Such milestones may be associated with the use of the vehicle and may be determined based on the saving information and the usage data. The operation may further include controlling the display to render guidance information that includes the net value and information about the one or more milestones.

Figure 1:
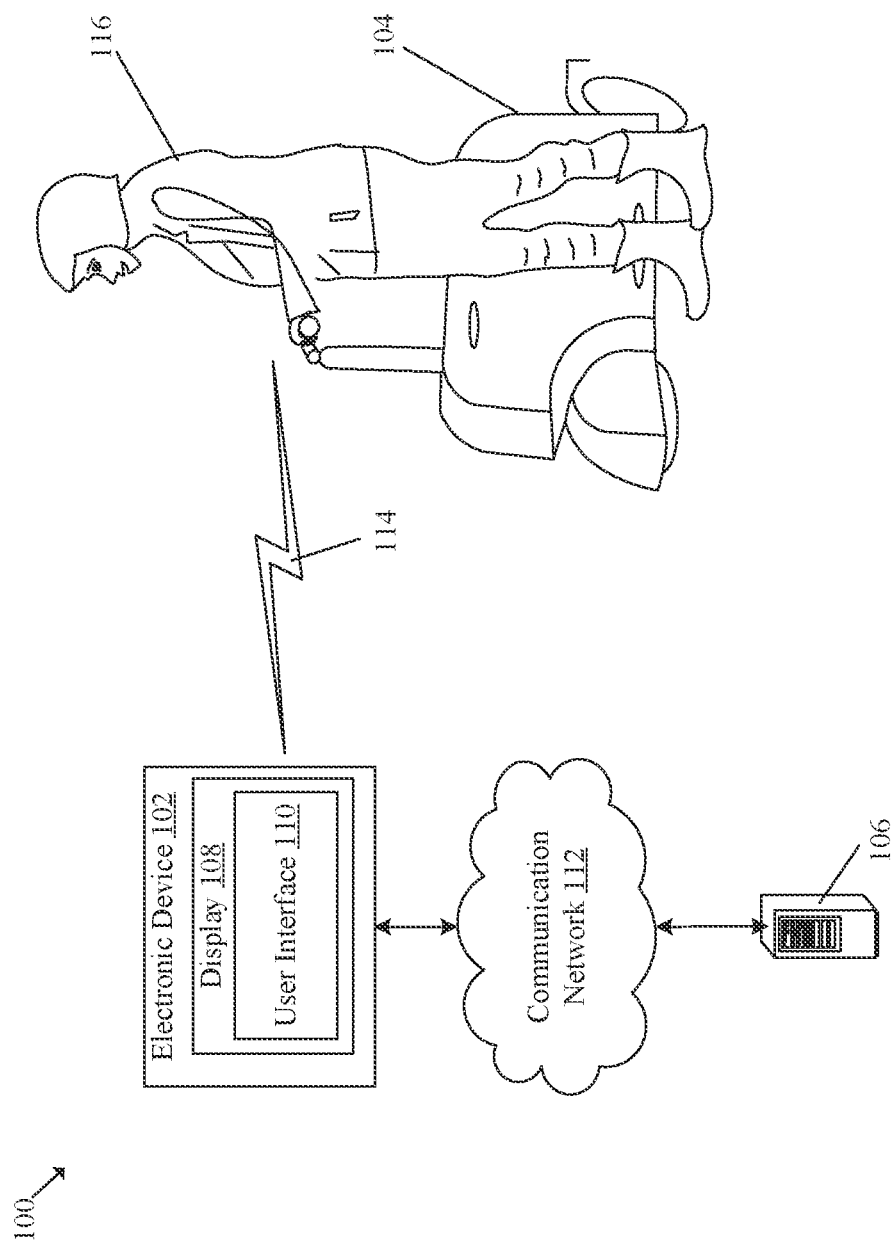
FIG. 1 is a diagram that illustrates an exemplary environment for guiding vehicle users to build a value with vehicle use, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed electronic device and method of guiding users to build equity or value with vehicle use. Exemplary aspects of the disclosure provide an electronic device that includes a display and circuitry that may collect usage data associated with a vehicle (e.g., a micro-mobility vehicle) and competition information associated with one or more transport options that may be different from the vehicle. The circuitry may determine saving information associated with a use of the vehicle over a period, based on the usage data and the competition information. The circuitry may further determine one or more milestones that may have been achieved over the period or may have to be achieved to accumulate a net value which exceeds expenses associated with the vehicle. Such milestones may be associated with the use of the vehicle and may be determined based on the saving information and the usage data. The circuitry may control the display to render guidance information that includes the net value and information about the one or more milestones.

Users who use vehicles such as a micro-mobility vehicle may not be aware if they are really able to cover up and get value out of their micro-mobility vehicle after spending a considerable amount on various expenses related to the micro-mobility vehicle. Without any guidance or support, the users may end up using travel options such as ride sharing services or public transport that may often cost more over a period. The disclosed electronic device and method may help to encourage a user to understand savings associated with a usage of the vehicle and may also help build a value that accumulates over a period with the use of the vehicle. The electronic device may provide one or milestones that may need to be achieved so that the net value exceeds the expenses incurred on the vehicle.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates an exemplary environment 100 for guiding vehicle users to build value with vehicle use, in accordance with an embodiment of the disclosure. In the exemplary environment 100, there is shown an electronic device 102, a vehicle 104, and a server 106. The electronic device 102 may include a display 108 and a user interface 110. The electronic device 102 and the server 106 may be communicatively coupled to each other via a communication network 112. Also, the electronic device 102 and the vehicle 104 may be communicatively coupled to each other via a communication network 114. There is further shown a user 116 who may be a driver or an occupant of the vehicle 104.

The electronic device 102 may include suitable logic, circuitry, and interfaces that may be configured to control the display 108 to render guidance information for the user 116. The guidance information may include information about one or more milestones that the user 116 may have achieved over a period or the user 116 may have to achieve to accumulate a net value which exceeds expenses associated with the vehicle 104. Examples of the electronic device 102 may include, but are not limited to, a computing device, a smartphone, a cellular phone, a mobile phone, a gaming device, a mainframe machine, a server, a computer workstation, and/or a consumer electronic (CE) device. In an embodiment, the electronic device 102 may be a part of or may be integrated into the vehicle 104.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 104 may be a system through which the user 116 may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car.

In accordance with an embodiment, the vehicle 104 may be a micro-mobility vehicle. The micro-mobility vehicle may be used mostly for short distance as it may offer a relatively low mileage because of battery size. The micro-mobility vehicle may be relevant for traveling short distances at a low cost in comparison to cost associated with conventional travel options. In accordance with an embodiment, the micro-mobility vehicle may be compactable and may include certain components that may fold over, slide over other components, retract inside a space, and/or be detached from support members of the micro-mobility vehicle. When not being used, the micro-mobility vehicle may be disposed in a compacted state to allow the user 116 to easily carry and store the vehicle 104 in the compacted state. To operate the vehicle 104, the user 116 may simply uncompact the micro-mobility vehicle. For example, components, such as handlebar, seats, and wheels may have to be extended from a retracted state. The micro-mobility vehicle may include a suitable propulsion system, a driving mechanism, and an energy source(s) that may allow the user 116 to ride the micro-mobility vehicle for a limited distance.

The vehicle 104 of FIG. 1 is merely shown as an example and such an example should not be construed as limiting the disclosure. The present disclosure may be applicable to other types of vehicles, such as, but not limited to, a one-wheeler vehicle, a two-wheeler vehicle, a three-wheeler vehicle, or a vehicle with more than three wheels. A description of other types of vehicles has been omitted from the disclosure for the sake of brevity.

The server 106 may include suitable logic, circuitry, and interfaces, and/or code that may be configured to collect usage data associated with a vehicle (e.g., a micro-mobility vehicle) and may provide the competition information associated with one or more transport options to the electronic device 102. The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without a departure from the scope of the disclosure.

The display 108 may include suitable logic, circuitry, and interfaces that may be configured to display guidance information for the user 116. The display 108 may be a touch screen which may enable the user 116 to provide a user-input via the display 108. The touch screen may be at least one of a resistive touch screen, a capacitive touch screen, or a thermal touch screen. The display 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display 108 may refer to a display screen of a head mounted device (HMD), a smart-glass device, a see-through display, a projection-based display, an electro-chromic display, or a transparent display.

The user interface 110 may be rendered on a display screen of the display 108. The user interface 110 may be configured to display guidance information that includes a net value accumulated over a period with the usage of the vehicle 104 and information about one or more milestones to be achieved over the period. An example of the user interface 110 is a graphical user interface (GUI) of a mobile application that may be accessible via a mobile device, such as a smartphone.

The communication network 112 may include a communication medium through which the electronic device 102 and the server 106 may communicate with each other. The communication network 112 may be one of a wired connection or a wireless connection. Examples of the communication network 112 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The communication network 114 may be the same as the communication network 112 or may be a different network, such as a wireless P2P network established using Bluetooth®, Wi-Fi, or other short-range or long-range wireless communication protocols.

In operation, the electronic device 102 may collect usage data associated with the vehicle 104. The vehicle 104 may be owned or rented by the user 116. The usage data may be collected based on a user input from the user 116 or a set of stored rules. For example, a usage tracking application of the electronic device 102 may collect the usage data when a ride with the vehicle 104 is booked, started, and/or completed. The usage tracking application may be part of a software application used to register with the vehicle 104, track rides with the vehicle 104, and/or view information associated with the vehicle 104.

In accordance with an embodiment, the usage tracking application may provide one or more user elements (UIs), such as a tap button, a sliding feature, or a press and hold button for receiving the usage data. For example, when the user 116 taps on the button associated with the start of a ride, the usage tracking application may deduce that the user 116 has started a new ride with the vehicle 104. The usage tracking application may record, for example, location information associated with the ride and timing information associated with the ride. Examples of the usage data may include, but are not limited to, a fuel usage pattern within the period of the usage of the vehicle 104, a number of times the vehicle 104 is used for travel in comparison to one or more transport options, locations covered using the vehicle 104, a distance travelled by the vehicle 104 over the period of the usage, a number of milestones achieved by the user 116 over the period of the usage, an actual mileage per charge of the vehicle 104, and a driving or riding pattern of the user 116 of the vehicle 104. The acquisition of the usage data is described, for example, in FIG. 3.

In accordance with an embodiment, the usage data may include expenses associated with the vehicle 104. Expenses associated with the vehicle 104 may be a total amount spent on the vehicle 104 to keep the vehicle 104 in usable condition. In accordance with an embodiment, the expenses may include one or more of a purchase cost, a rental cost, a maintenance cost, an insurance cost, a tax cost, and a usage cost that includes a parking fee and a power or fuel cost. The purchase cost may be an amount paid at a time of purchase of the vehicle 104. For example, the purchase cost of the vehicle 104 may be 300 dollars. The rental cost may be an amount paid for renting the vehicle 104 for a duration, such as six months. In some embodiments, the user 116 may rent the vehicle 104 instead of purchasing it. In such a case, the rental cost may be taken in account. For example, the rental cost of renting the vehicle 104 for 100 days may be 50 dollars. The rental cost may be provided on an hourly basis, daily basis, monthly basis, and the like. The maintenance cost may include costs, such as, service charge, oil refilling charge, the repair cost and the like incurred on maintaining the vehicle 104. The insurance cost may be the amount paid for insuring the vehicle 104 against accidents, theft of the vehicle 104, damage of the vehicle due to uncertain conditions, and the like. For example, the insurance cost of the vehicle 104 may be 50 dollars. The tax cost may be a tax paid annually or at a time a of registration of vehicle 104. For example, the tax paid on the vehicle 104 may be 30 dollars. The usage cost may be a cost incurred based on day-to-day use of the vehicle 104. For example, the usage cost may include a parking fee and a power or fuel cost to run the vehicle 104.

The electronic device 102 may further collect competition information associated with one or more transport options that may be different from the vehicle 104. Such transport options may include, for example, ride hailing services, public transport options, taxi services, car rentals, and the like. The competition information may provide data related to each of the transport options. For example, if the transport options include a bus service and a shared cab service then the competition information may include a charge (e.g., in USD) and a travel time spent while using the bus and the shared car service for travelling from one location to another.

The electronic device 102 may further determine saving information associated with a use of the vehicle 104 over a period, based on the usage data and the competition information. The saving information may correspond to a value that the user 116 may save while using the vehicle 104 over the one or more transport options. The savings information may be determined by calculating a time saved or an amount saved by using the vehicle 104 over the one or more transport options.

In accordance with an embodiment, the saving information may correspond to time savings or monetary savings. For example, if a ride with a cab or taxi costs 10 dollars and a ride with the vehicle 104 costs 3 dollars, then the user 116 may save 7 dollars for every ride with the vehicle 104. As another example, if a cab or taxi takes 45 minutes and the micro-mobility vehicle takes 30 minutes for same distance due to traffic conditions or route constraints, then the user 116 may save 15 minutes for every ride with the vehicle 104. The saving information may thus indicate an amount of time or money that can be or may be saved by using the vehicle 104. The saving information may also indicate whether or not it is worth to choose the vehicle 104 in comparison to other alternate travel options for a ride to a given destination.

In accordance with an embodiment, conditions, such as weather conditions, traffic conditions, inflation, surge pricing (for ride sharing services), waiting times may be used for determining the saving information. As an example, an average time taken for travelling on a rainy-day from one location to other location using the vehicle 104 and the one or more transport options may be used to determine the saving information. If time taken to travel is 35 minutes using the vehicle 104 and 45 minutes using a ride hailing service, then the time savings may be 10 minutes. On a sunny day, if the time taken to travel is 25 minutes using the vehicle 104 and 45 minutes using the ride hailing service, then the time savings may be 20 minutes.

The electronic device 102 may further determine one or more milestones that may have been achieved over the period or may have to be achieved to accumulate a net value which exceeds expenses associated with the vehicle 104. Thus, the net value may be a measure of equity that may be accumulated over time with usage of the vehicle 104. As an example, a milestone may require the user 116 to complete 10 rides per month in order to achieve a net value of 100 dollars that may exceed expenses of 80 dollars on the vehicle 104 for that month. As another example, a milestone may require the user 116 to complete 30 hours of rides per month to achieve a net value of 100 dollars that may exceed expenses of 80 dollars on the vehicle 104 for that month. The more the vehicle 104 is used, the more equity may be built into it. For example, even though the user 116 may spend an initial fee on the vehicle 104, the more the vehicle 104 is used lesser the travel costs could be with respect to costs associated with other travel options.

In accordance with an embodiment, the net value and the expenses may be represented as monetary values. For example, the expense may be 150 dollars and the net value may be 180 dollars. To cover up the expenses with savings, the net value must remain greater than the expenses.

In accordance with an embodiment, the net value and the expenses may be represented as time values. The net value may provide a measure of time that may be saved by using the vehicle 104 over one or more travel options (different from the vehicle 104). The expenses may be a measure of time the user 116 may have spent using the vehicle 104. The time spent may include the time spent on maintenance, repair, charging, and the like.

The one or more milestones may be associated with the use of the vehicle 104 and may be determined based on the saving information and the usage data. As an example, a bus service may cost 20 dollars and the vehicle 104 may cost 10 dollars for travelling from a place 'A' to a place 'B'. The saving information may indicate that the user 116 saved 10 dollars for every ride using the vehicle 104. The usage data may indicate that the vehicle 104 has been used for travelling from place A to place B for a total of 20 times. For a net value of 250 dollars, the milestone may require the user 116 to complete 10 rides in a month. In accordance with an embodiment, the one or more milestones may be represented in term of time values.

The electronic device 102 may control the display 108 to render guidance information that includes the net value and information about the one or more milestones. The guidance information may assist the user 116 in achieving a net value that exceeds the expenses. For example, a notification or a message may be provided via the display 108. The notification or message may state the net value at current time and a status of the one or more milestones to be completed to achieve a net value that exceeds the expenses. Additionally, or alternatively, the guidance information may be displayed on a web page or on a User Interface of a mobile application. Details of the guidance information are further provided, for example, in FIG. 3.

By rendering the guidance information, the electronic device 102 may guide the user 116 to understand a value that may accumulate over a period with usage of a personal vehicle such as a micro-mobility vehicle over other travel options. The user 116 may be encouraged to use the vehicle 104 more often that other transport options. The more the vehicle 104 is used, the more equity may be built into it. For example, even though the user 116 may spend an initial fee on the vehicle 104, the more the vehicle 104 is used lesser the travel costs could be with respect to costs associated with other travel options. This may improve user's satisfaction with the vehicle 104.

In case a product such as the vehicle 104 is rented out for a period of time, the guidance information may indicate a maximum amount of time for which the product should be actively used to generate a net value that covers a rental cost associated with the product. For example, the guidance information may indicate that the product should be used for at least 60 minutes in order to realize a net value from the rental deal. In some scenarios, the guidance information may inform an owner (who may be renting out the product) of the product that the product should be rented out for five hours every month to make their money back on the product.

Figure 2:
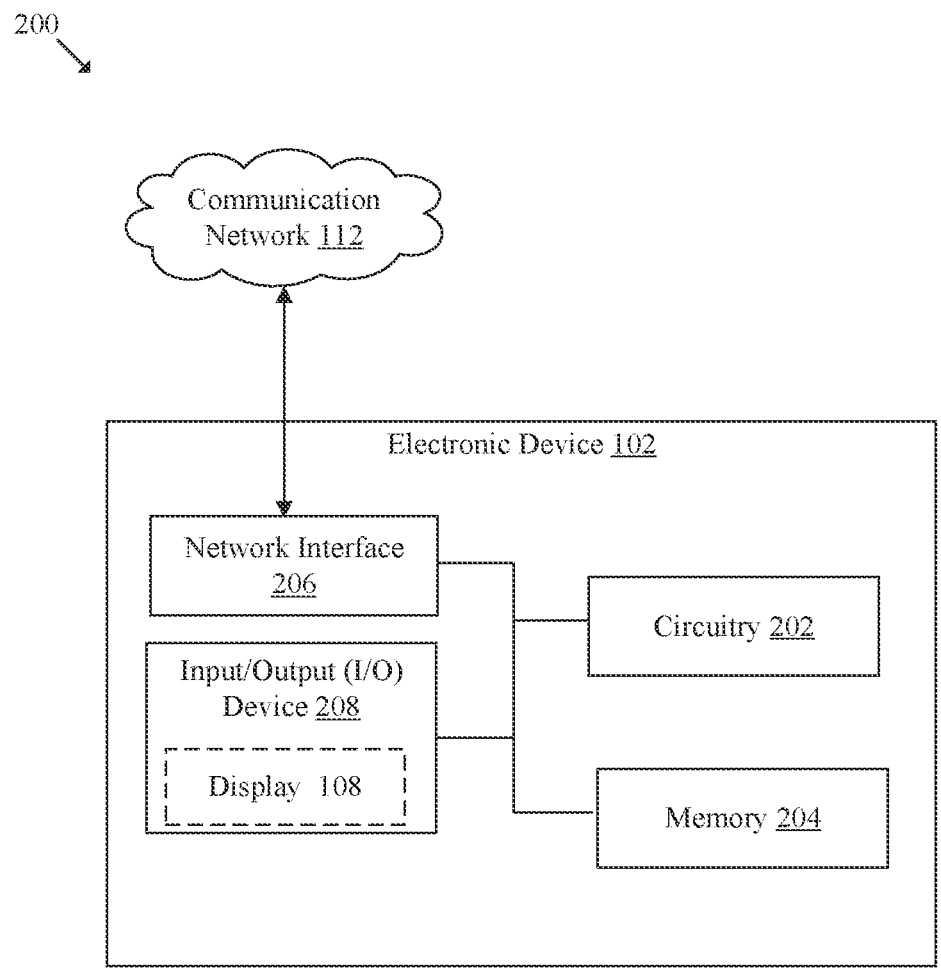
FIG. 2 illustrates a block diagram of an exemplary electronic device, in accordance with an embodiment of the disclosure.

FIG. 2 is a block diagram of an exemplary electronic device, in accordance with an embodiment of the disclosure. FIG. 2 is explained in conjunction with elements from FIG. 1. With reference to FIG. 2, there is shown a block diagram 200 of the electronic device 102. The electronic device 102 may include a circuitry 202, a memory 204, a network interface 206, and an input/output (I/O) device 208 comprising the display 108. Although in FIG. 2, it is shown that the electronic device 102 includes the circuitry 202, the memory 204, the network interface 206, and the input/output (I/O) device 208; however, the disclosure may not be so limiting, and the electronic device 102 may include less or more components to perform the same or other functions of the electronic device 102. Details of the other functions or components have been omitted from the disclosure for the sake of brevity.

The circuitry 202 may include suitable logic, circuitry, and interfaces that may be configured to execute program instructions associated with different operations to be executed by the electronic device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the one or more instructions to be executed by the circuitry 202. The memory 204 that may be configured to store the usage data associated with the vehicle 104 and the competition information associated with one or more transport options that are different from the vehicle 104. The memory 204 may be further configured to store the saving information, and the net value. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. The memory 204 may include suitable logic, circuitry, and/or interfaces that may store a set of instructions executable by the circuitry 202. The memory 204 may also store the captured plurality of brainwave signals in a storable format and other intermediate information during the operation of the circuitry 202. The memory 204 may be a persistent storage medium, a non-persistent storage medium, or a combination thereof. Examples of implementation of the memory 204 may include, but are not limited to, Random Access Memory (RAM), Read Only Memory (ROM), Hard Disk Drive (HDD), Solid State Drive (SSD), flash memory, cache memory, and/or a Secure Digital (SD) card.

The network interface 206 may include suitable logic, circuitry, and interfaces that may be configured to facilitate communication between the circuitry 202, the server 106 and the vehicle 104 via the communication network 112 and the communication network 114. The network interface 206 may be implemented by use of various known technologies to support wired or wireless communication of the electronic device 102 with the communication network 112 and the communication network 114. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 206 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The input/output (I/O) device 208 may include suitable logic, circuitry, and interfaces that may be configured to receive an input from the user 116 and provide an output based on the received input. The I/O device 208 which may include various input and output devices, may be configured to communicate with the circuitry 202. Examples of the I/O device 208 may include, but are not limited to, a touch screen, a keyboard, a mouse, a joystick, a microphone, a display device, and a speaker. Based on the input received from the user 116 on the I/O device 208, the usage data associated with the vehicle 104 may be collected.

The functions or operations executed by the electronic device 102, as described in FIG. 1, may be performed by the circuitry 202. Operations executed by the circuitry 202 are described in detail, for example, in FIG. 3.

Figure 3:
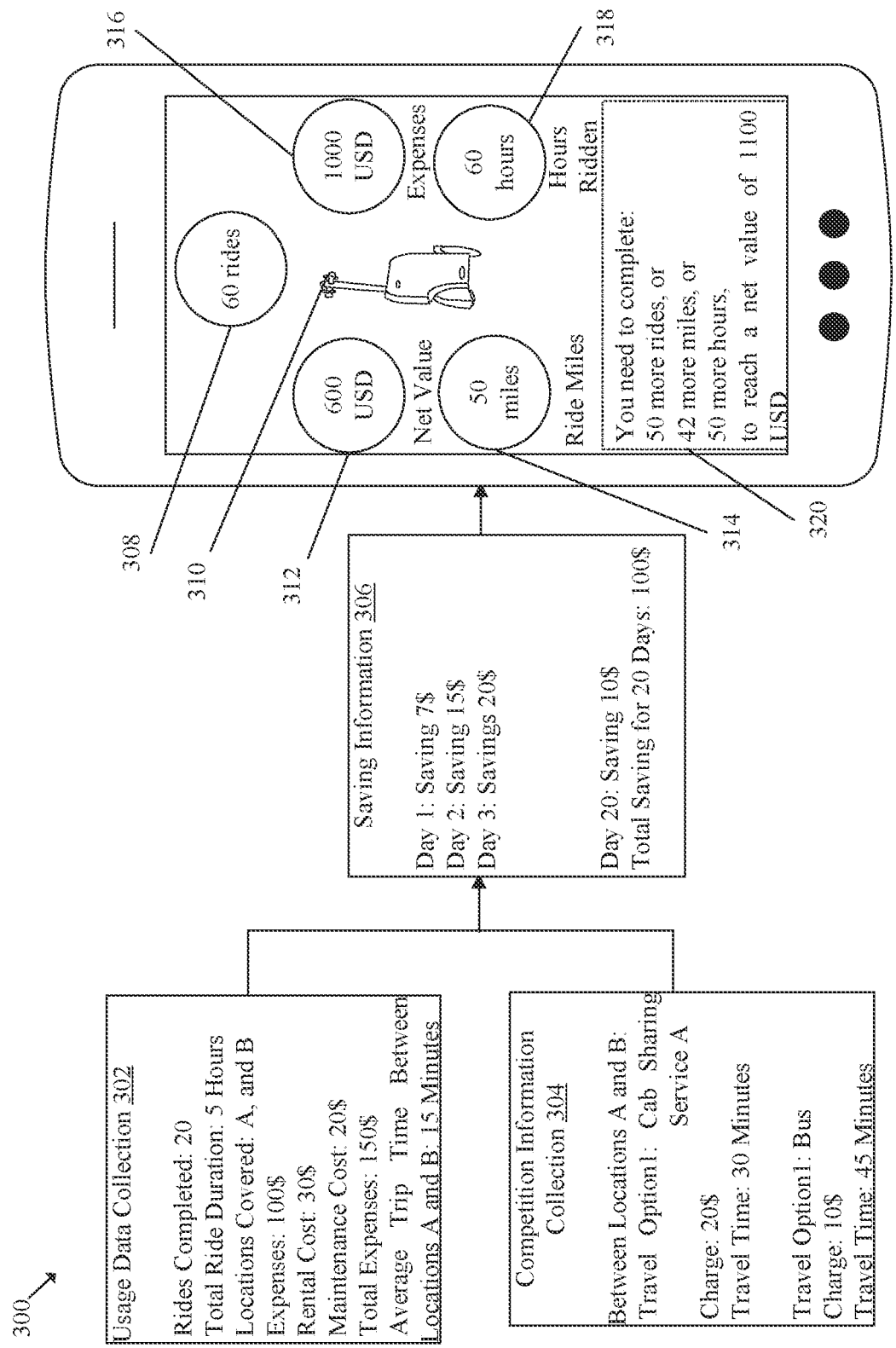
FIG. 3 illustrates an exemplary scenario in which an electronic device guides vehicle users to build a value with vehicle use, in accordance with an embodiment of the disclosure.

FIG. 3 is a diagram that illustrates an exemplary scenario in which an electronic device guides vehicle users to build a value with vehicle use, in accordance with an embodiment of the disclosure. FIG. 3 is explained in conjunction with elements from FIG. 1 and FIG. 2. With reference to FIG. 3, there is shown an exemplary scenario 300 for providing guidance information to the user 116. The exemplary scenario 300 includes the electronic device 102 with the display 108 integrated into the electronic device 102. The display 108 of the electronic device 102 may include a first UI element 308, a second UI element 310, a third UI element 312, a fourth UI element 314, a fifth UI element 316, a sixth UI element 318, and a seventh UI element 320. Operations to generate and display the guidance information are provided herein.

At 302, the circuitry 202 of the electronic device 102 may collect usage data associated with the vehicle 104. In an embodiment, the usage data may be collected over a period and may include ride-related data which indicates at least one of a number of times the vehicle 104 is used for rides, a set of locations covered using the vehicle 104, a distance travelled per ride using the vehicle 104, a number of riding milestones achieved over the period, an actual mileage per charge associated with the vehicle 104, and a driving or riding pattern of the user 116 of the vehicle 104. The number of times the vehicle 104 is used for rides may be a total number of times the vehicle 104 is ridden by the user 116 since the time of its purchase or it being rented/rented out. As an example, the number of times the vehicle 104 is used for rides may be 150. The set of locations may include geographical coordinates and names of locations travelled to or travelled from by using the vehicle 104. For example, the set of locations covered by the vehicle 104 may be a first location A, a second location B, a third location C, and a fourth location D. The distance travelled per ride using the vehicle 104 may provide individual distances covered each time the vehicle 104 is ridden. For example, the distance travelled for a first ride for visiting the second location B from the first location A may be 5 miles, and the distance travelled in a second ride for visiting the second location B from the third location C may be 7 miles. In some embodiments, the distance travelled per ride may include an average distance covered by the vehicle 104. In the previous example, the distance travelled may be taken as 6 miles per ride which may be obtained by averaging the distances covered in all rides. The number of riding milestones achieved over the period may be a number of milestones surpassed by the vehicle 104. For example, the vehicle 104 may have achieved a first milestone of ten rides per month and a second milestone of 100 hours per month.

The actual mileage per charge associated with the vehicle 104 may provide an average distance covered on road per charge. For example, after fully charging the vehicle 104, the vehicle 104 may provide a range of twenty miles, beyond which the vehicle 104 may need to be charged again. Thus, the actual mileage may be twenty miles. In some cases, the usage data may indicate a maximum time duration for which the vehicle 104 can be ridden per charge under certain driving parameters (e.g., speed, load on the vehicle 104, and the like) or conditions (e.g., an ambient temperature).

The driving or riding pattern of the user 116 of the vehicle 104 may provide information related to locations that are visited frequently by the user 116, a time duration in which the vehicle 104 is ridden often, the weather condition, the traffic condition, and the like in which the vehicle 104 is ridden. For example, the user 116 may reside at the first location A and may travel to his workplace (i.e., the second location B) between 9.00 AM to 9.30 AM.

In an embodiment, the usage data may include expenses associated with the vehicle 104. The expenses associated with the vehicle 104 may be total amount spent by the user 116 on the vehicle 104. The expenses may include one or more of a purchase cost, a rental cost, a maintenance cost, an insurance cost, a tax cost, and a usage cost that includes a parking fee and a power or fuel cost. The purchase cost may be amount paid for purchasing the vehicle 104. The maintenance cost may include an amount spent on maintenance and/or repairs of the vehicle 104. The insurance cost may be an amount paid for insuring the vehicle 104. The tax cost may include the amount spent on paying taxes such as a tax of purchase of the vehicle 104, a toll tax, or a road tax. The usage cost may include the parking fee and the power or fuel cost associated with the vehicle 104.

As shown in FIG. 3, for example, the number of times the vehicle 104 is used for rides is twenty. The duration for which the vehicle 104 is ridden is 5 hours. The set of locations covered using the vehicle 104 are locations A and B. Expenses incurred on the vehicle 104 may be 100 dollars, the rental cost of renting the vehicle 104 for a certain duration may be 30 dollars, and the maintenance cost of the vehicle 104 may be 20 dollars. Thus, a total amount spent on the vehicle 104 may be 150 dollars. The average trip time to travel between locations A and B may be 15 Minutes.

At 304, competition information associated with one or more transport options may be collected. Such options may be different from the vehicle 104 and may include, for example, ride hailing services, public transport options, taxi services, car rentals, and the like. The competition information may provide information related to each of the transport options. For example, if the transport options include a bus service, then the competition information may include charges paid for using the bus and a time taken by the bus when travelling from one location to another location. An example of the competition information for the locations A and B is provided herein. The first travel option includes a cab sharing service that charges 20 dollars and takes a travel time of 20 minutes. The second travel option may include a bus service that charges 10 dollars and takes a travel time of 45 minutes.

At 306, the saving information associated with the use of the vehicle 104 over the period may be determined. The saving information may be determined based on the usage data and the competition information. The saving information may provide information related to an amount of money or time that may be or can be saved by using the vehicle 104 over the one or more travel options.

In an embodiment, the saving information may correspond to time savings or monetary savings. For example, if a travel option costs 20 dollars and a ride using the vehicle 104 costs 12 dollars, then the user 116 may save 8 dollars for every ride with the vehicle 104. As another example, if the travel option takes 1 hour of travel from one location to another location and the vehicle 104 takes 40 minutes of travel from one location to another location, then the user 116 may save 20 minutes by riding or driving the vehicle 104.

As shown in FIG. 3, for example, the saving information may be determined based on the usage data collected at 302 and the competition information collected at 304. The amount saved on each day from day 1 to day 20 by using the vehicle 104 is provided. For example, the savings for day 1 may be seven dollars, the savings for day 2 may be 15 dollars, and the savings for day 3 may be 20 dollars. Similarly, the savings for day 20 may be 10 dollars by using the vehicle 104. The total savings for 20 days may be as 100 dollars.

Once the saving information is determined, the circuitry 202 may determine one or more milestones that may have been achieved over the period or may have to be achieved to accumulate a net value which may exceed expenses associated with the vehicle 104. The one or more milestones may be associated with the use of the vehicle 104 and may be determined based on the saving information and the usage data. In one embodiment, the net value and the expenses may be represented as monetary values. For example, the net value and the expenses may be provided in dollars. In another embodiment, the net value and the expenses may be represented as time values. The net value may be a measure of time that may be saved by using the vehicle 104 with respect to other travel options. The expenses may provide a measure of time that the user 116 may have spent using the vehicle 104. The time spent may include the time spent on maintenance, repairs, charging, and the like. For example, the expenses may be 48 hours and the net value may be 50 hours.

In an embodiment, the one or more milestones may include a number of rides, a total amount of ride hours, a total travel distance, or a number of times the vehicle 104 may have been put up or should be put up for a rent or a lease. The number of rides may include a number of times the vehicle 104 may be ridden since the time of purchase or the vehicle 104 being rented. For example, the number of rides may be 100 and the vehicle 104 may have to be ridden at least 100 times to achieve a net value that is greater than the expenses. The total amount of ride hours may be a total number of hours for which the vehicle 104 may be ridden to achieve a net value that may be greater than the expenses. For example, the total amount of ride hours may be 100 hours and the vehicle 104 may have to be ridden for 100 hours to achieve a net value that may be greater than the expenses.

The circuitry 202 may control the display 108 to render guidance information that includes the net value and information about the one or more milestones. The guidance information may be provided via a message, a notification, a user interface of a mobile application, or a webpage on the display 108.

As shown, for example, the first UI element 308 may provide a number of times (e.g., 60 times) the vehicle 104 is ridden. The second UI element 310 may provide an image of the vehicle 104. The third UI element 312 may provide a net value (e.g., 600 dollars) accumulated by using the vehicle 104. The net value of 600 dollars may be accumulated by using the vehicle 104 for 60 rides. The fourth UI element 314 may provide a total travel distance of 50 miles covered by riding the vehicle 104. The fifth UI element 316 may provide total expenses of 100 dollars on the vehicle 104. The sixth UI element 318 may provide a total duration of 60 hours for which the vehicle 104 is ridden.

The seventh UI element 320 may render the guidance information. For example, if the user 116 completes 50 more rides on the vehicle 104, travels 42 more miles by using the vehicle 104, or travels for 50 more hours using the vehicle 104, then a net value of 1000 dollars may be achieved. The guidance information may be provided as a message on the display 108. As another example, a milestone may require that the vehicle 104 be put up for lease at least 20 times to accumulate a certain net value over a period. For such a milestone, the guidance information may include a message that prompts the user 116 to lease the vehicle 104 for at least 20 times.

In accordance with an embodiment, the circuitry 202 may receive a user input via the display 108 in response to the rendered guidance information. Based on the input, the circuitry 202 may collect progress data associated with a milestone of the determined one or more milestones. The circuitry 202 may update the net value and a status of the milestone, based on the progress data. Once the guidance information is provided to the user 116 via the display 108, the user 116 may respond by taking appropriate actions to achieve one or more milestones. For example, based on the guidance information provided via the seventh UI element 320, the user 116 may start using the vehicle 104 for $61^{st}$ ride. On the $61^{st}$ ride, the user 116 may save 10 dollars (compared to costs associated with alternate travel options) and may now need to complete 49 more rides. The net value may be updated to 610 dollars from a previous value of 600 dollars, and the milestone may be updated to 49 rides from a previous value of 50 rides. Thus, with each ride, the milestone and the net value accumulated may be updated.

Figure 4:
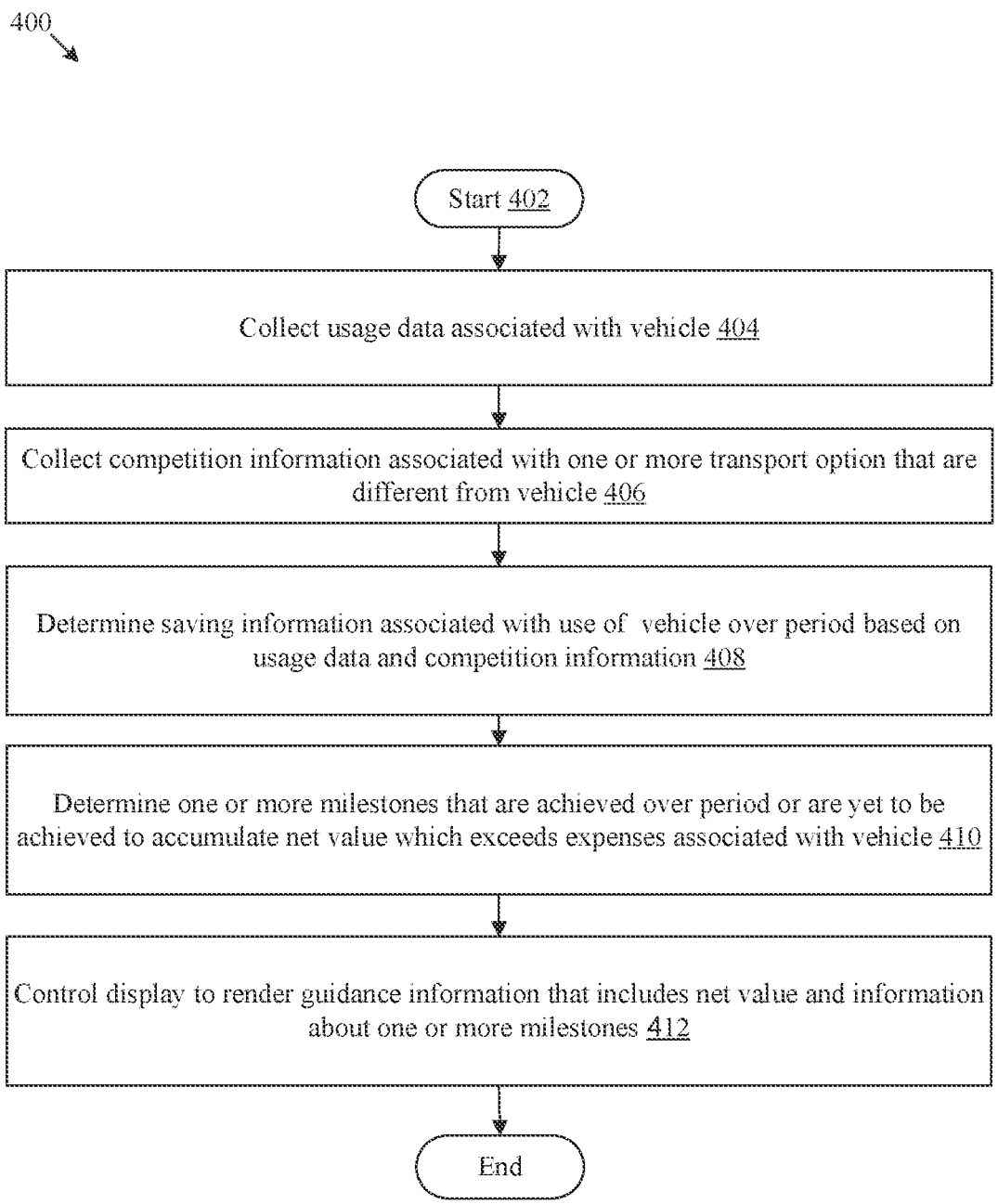
FIG. 4 illustrates a flowchart of an exemplary method for guiding vehicle users to build a value with vehicle use, in accordance with an embodiment of the disclosure.

FIG. 4 illustrates a flowchart 400 of an exemplary method for guiding vehicle users to build a value with vehicle use, in accordance with an embodiment of the disclosure. The flowchart 400 is described in conjunction with FIGS. 1, 2, and 3. The operations from 402 to 412 may be implemented, for example, by the circuitry 202 of FIG. 2. The operations of the flowchart 400 may start at 402 and proceed to 412.

At 404, the usage data associated with the vehicle 104 may be collected. In accordance with an embodiment, the circuitry 202 may collect the usage data. Details about the collection of the usage data are provided, for example, in FIG. 3 (at 302).

At 406, the competition information associated with one or more transport option may be collected. In accordance with an embodiment, the circuitry 202 may collect competition information associated with one or more transport option. Such options may be different from the vehicle 104. Details about the collection of the competition information are provided, for example, in FIG. 3 (at 304).

At 408, the saving information associated with the use of the vehicle 104 over the period may be determined based on the usage data and the competition information. In accordance with an embodiment, the circuitry 202 may determine the saving information associated with the use of the vehicle 104 over the period based on the usage data and the competition information. The saving information may correspond to how much the user 116 may save when choosing the vehicle 104 over the one or more transport options for rides. For example, the user 116 may save 10 dollars per ride by using the vehicle 104 over the one or more transport options. In another example, the user 116 may save 15 minutes by riding the vehicle 104 instead of the one or more travel options. Details about the determination of the saving information are provided, for example, in FIG. 3 (at 306).

At 410, the one or more milestones may be determined. In accordance with an embodiment, the circuitry 202 may determine the one or more milestones. Such milestones may have been achieved over the period or may have to be achieved to accumulate a net value which exceeds expenses associated with the vehicle 104. The one or more milestones may be associated with the use of the vehicle 104 and may be determined based on the saving information and the usage data. Details about the determination of the one or more milestones are provided, for example, in FIG. 3 (as shown on the display 108 of the electronic device 102).

At 412, the display 108 may be controlled to render guidance information that includes the net value and information about the one or more milestones. In accordance with an embodiment, the circuitry 202 may control the display 108 to render guidance information that includes the net value and information about the one or more milestones. The guidance information may be provided in a number of ways. For example, a notification stating the net value and the one or more milestones needed to be covered in order to achieve the net value may be provided via the display 108. Details about the rendering of the guidance information are provided, for example, in FIG. 3 (as shown by the seventh UI element 320, for example).

Although the flowchart 400 is illustrated as discrete operations, such as 404, 406, 408, 410, and 412 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide non-transitory computer-readable medium having stored thereon. The computer-executable instructions may be executed by the electronic device 102 may cause the electronic device 102 to execute operations. The operations may include collecting usage data associated with the vehicle 104. The operations may include collecting competition information associated with one or more transport option that are different from the vehicle 104. The operations may include determining saving information associated with the use of the vehicle 104 over the period based on the usage data and the competition information. The operations may include determining one or more milestones that are achieved over the period or are yet to be achieved to accumulate the net value which exceeds expenses associated with the vehicle 104. Herein, the one or more milestones are associated with the use of the vehicle and are determined based on the saving information and the usage data. The operations may include controlling the display 108 to render guidance information that includes the net value and information about the one or more milestones.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
a display; and
circuitry that:
  collects usage data associated with a vehicle;
  collects competition information associated with one or more transport options that are different from the vehicle;
  determines saving information associated with a use of the vehicle over a period, based on the usage data and the competition information;
  determines one or more milestones that are achieved over the period or are yet to be achieved to accumulate a net value which exceeds expenses associated with the vehicle,
    wherein the one or more milestones are associated with the use of the vehicle, and are determined based on the saving information and the usage data; and
  controls the display to render guidance information that includes the net value and information about the one or more milestones.

2. The electronic device according to claim 1, wherein the usage data is collected over the period and comprises ride-related data which indicates at least one of a number of times the vehicle is used for rides, a set of locations covered using the vehicle, a distance travelled per ride using the vehicle, a number of riding milestones achieved over the period, an actual mileage per charge associated with the vehicle, and a driving or riding pattern of a user of the vehicle.

3. The electronic device according to claim 1, wherein the usage data comprises expenses associated with the vehicle.

4. The electronic device according to claim 1, wherein the expenses include one or more of: a purchase cost, a rental cost, a maintenance cost, an insurance cost, a tax cost, and a usage cost that includes a parking fee and a power or fuel cost.

5. The electronic device according to claim 1, wherein the vehicle is a micro-mobility vehicle.

6. The electronic device according to claim 1, wherein the saving information corresponds to time savings or monetary savings.

7. The electronic device according to claim 1, wherein the net value and the expenses are represented as monetary values.

8. The electronic device according to claim 1, wherein the net value and the expenses are represented as time values.

9. The electronic device according to claim 1, wherein the one or more milestones comprise a number of rides, a total amount of ride hours, a total travel distance, or a number of times the vehicle is put up or is to be put up for a rent or a lease.

10. The electronic device according to claim 1, wherein the circuitry further:
  receives a user input via the display in response to the rendered guidance information;
  collects progress data associated with a milestone of the determined one or more milestones, based on the received input; and
  updates the net value and a status of the milestone, based on the progress data.

11. A method, comprising:
collecting usage data associated with a vehicle;
collecting competition information associated with one or more transport option that are different from the vehicle;
determining saving information associated with a use of the vehicle over a period, based on the usage data and the competition information;
determining one or more milestones that are achieved over the period or are yet to be achieved to accumulate a net value which exceeds expenses associated with the vehicle,
  wherein the one or more milestones are associated with the use of the vehicle, and are determined based on the saving information and the usage data; and
controlling a display to render guidance information that includes the net value and information about the one or more milestones.

12. The method according to claim 11, wherein the usage data is collected over the period and comprises ride-related data which indicates at least one of a number of times the vehicle is used for rides, a set of locations covered using the vehicle, a distance travelled per ride using the vehicle, a number of riding milestones achieved over the period, an actual mileage per charge associated with the vehicle, and a driving or riding pattern of a user of the vehicle.

13. The method according to claim 11, wherein the usage data comprises expenses associated with the vehicle.

14. The method according to claim 11, wherein the expenses include one or more of: a purchase cost, a rental cost, a maintenance cost, an insurance cost, a tax cost, and a usage cost that includes a parking fee and a power or fuel cost.

15. The method according to claim 11, wherein the vehicle is a micro-mobility vehicle.

16. The method according to claim 11, wherein the net value and the expenses are represented as monetary values.

17. The method according to claim 11, wherein the net value and the expenses are represented as time values.

18. The method according to claim 11, wherein the one or more milestones comprise a number of rides, a total amount of ride hours, a total travel distance, or a number of times the vehicle is put up or is to be put up for a rent or a lease.

19. The method according to claim 11, further comprising:
  receiving a user input via the display in response to the rendered guidance information;
  collecting progress data associated with a milestone of the determined one or more milestones, based on the received input; and
  updating the net value and a status of the milestone, based on the progress data.

20. A non-transitory computer-readable medium having stored thereon, computer-executable instructions that when executed by an electronic device, causes the electronic device to execute operations, the operations comprising:
  collecting usage data associated with a vehicle;

collecting competition information associated with one or more transport option that are different from the vehicle;

determining saving information associated with a use of the vehicle over a period, based on the usage data and the competition information;

determining one or more milestones that are achieved over the period or are yet to be achieved to accumulate a net value which exceeds expenses associated with the vehicle,
  wherein the one or more milestones are associated with the use of the vehicle, and are determined based on the saving information and the usage data; and controlling a display to render guidance information that includes the net value and information about the one or more milestones.

\* \* \* \* \*